United States Patent
Gonzalez et al.

(10) Patent No.: US 12,406,188 B1
(45) Date of Patent: Sep. 2, 2025

(54) SYSTEM AND METHOD FOR EVOLVED DATA AUGMENTATION AND SELECTION

(71) Applicant: Cognizant Technology Solutions U.S. Corporation, College Station, TX (US)

(72) Inventors: Santiago Gonzalez, Denver, CO (US); Jason Zhi Liang, Fremont, CA (US); Risto Miikkulainen, Stanford, CA (US)

(73) Assignee: Cognizant Technology Solutions U.S. Corportion, College Station, TX (US)

( * ) Notice: Subject to any disclaimer, the term of this patent is extended or adjusted under 35 U.S.C. 154(b) by 1190 days.

(21) Appl. No.: 17/193,812

(22) Filed: Mar. 5, 2021

Related U.S. Application Data

(60) Provisional application No. 62/987,138, filed on Mar. 9, 2020.

(51) Int. Cl.
  *G06N 3/086* (2023.01)
  *G06F 16/215* (2019.01)
  *G06N 3/04* (2023.01)

(52) U.S. Cl.
  CPC .......... *G06N 3/086* (2013.01); *G06F 16/215* (2019.01); *G06N 3/04* (2013.01)

(58) Field of Classification Search
  None
  See application file for complete search history.

(56) References Cited

U.S. PATENT DOCUMENTS

| | | |
|---|---|---|
| 5,845,266 A | 12/1998 | Lupien et al. |
| 5,920,848 A | 7/1999 | Schutzer et al. |
| 5,930,780 A | 7/1999 | Hughes et al. |
| 6,240,399 B1 | 5/2001 | Frank et al. |
| 6,249,783 B1 | 6/2001 | Crone et al. |

(Continued)

FOREIGN PATENT DOCUMENTS

| | | |
|---|---|---|
| EP | 2422276 | 2/2012 |
| EP | 2422278 | 2/2012 |

(Continued)

OTHER PUBLICATIONS

Devries, T. et al., "Dataset augmentation in feature space," downloaded from <arxiv.org/abs/1702.05538> (Feb. 17, 2017) 12 pp. (Year: 2017).*

(Continued)

*Primary Examiner* — Brian M Smith
(74) *Attorney, Agent, or Firm* — Dawn-Marie Bey; Bey & Cotropia PLLC

(57) ABSTRACT

A process for evolving a data augmentation policy for application to sample data from a dataset for us in training a neural network to perform a predetermined task is described. An initial population of candidate data augmentation policy models, each model including multiple nodes which are distinct data augmentation operations and multiple edges which have weight values representing a probability related to action by a second node on input data from a first node. The models in the population are evaluated by applying to the sample data and at least partially training the neural network using the augmented sample dataset. A fitness is determined based on the results of the training and models are selected either as final policy models or for reproduction and repeating of the evolution process until a final model is selected.

12 Claims, 3 Drawing Sheets

(56) References Cited

U.S. PATENT DOCUMENTS

| | | | |
|---|---|---|---|
| 7,013,344 | B2 | 3/2006 | Megiddo |
| 7,370,013 | B1 | 5/2008 | Aziz et al. |
| 7,444,309 | B2 | 10/2008 | Branke et al. |
| 8,065,244 | B2 | 11/2011 | Chen et al. |
| 8,527,433 | B2 | 9/2013 | Hodjat et al. |
| 8,768,811 | B2 | 7/2014 | Hodjat et al. |
| 8,909,570 | B1 | 12/2014 | Hodjat et al. |
| 8,918,349 | B2 | 12/2014 | Hodjat et al. |
| 8,977,581 | B1 | 3/2015 | Hodjat et al. |
| 9,002,759 | B2 | 4/2015 | Hodjat et al. |
| 9,466,023 | B1 | 10/2016 | Shahrzad et al. |
| 9,489,630 | B2 | 11/2016 | Achin et al. |
| 10,268,953 | B1 | 4/2019 | Fink et al. |
| 10,430,709 | B2 | 10/2019 | Shahrzad et al. |
| 2002/0019844 | A1 | 2/2002 | Kurowski et al. |
| 2003/0019844 | A1 | 1/2003 | Shih |
| 2003/0149603 | A1 | 8/2003 | Ferguson et al. |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0187848 | A1 | 8/2005 | Bonissone et al. |
| 2005/0198103 | A1 | 9/2005 | Ching |
| 2007/0100907 | A1 | 5/2007 | Bayer |
| 2007/0143198 | A1 | 6/2007 | Brandes et al. |
| 2007/0143759 | A1 | 6/2007 | Ozgur et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2010/0030720 | A1 | 2/2010 | Stephens |
| 2010/0182935 | A1 | 7/2010 | David |
| 2010/0274736 | A1 | 10/2010 | Hodjat et al. |
| 2010/0274742 | A1 | 10/2010 | Hodjat et al. |
| 2010/0293119 | A1 | 11/2010 | Ferringer et al. |
| 2013/0124440 | A1 | 5/2013 | Hodjat et al. |
| 2015/0046181 | A1 | 2/2015 | Adjaoute |
| 2016/0350671 | A1 | 12/2016 | Morris, II et al. |
| 2017/0192638 | A1 | 7/2017 | Iscoe et al. |
| 2017/0193366 | A1 | 7/2017 | Miikkulainen et al. |
| 2017/0193367 | A1 | 7/2017 | Miikkulainen et al. |
| 2017/0193403 | A1 | 7/2017 | Iscoe et al. |
| 2017/0270225 | A1 | 9/2017 | Chen et al. |
| 2017/0293849 | A1 | 10/2017 | Hodjat et al. |
| 2018/0114115 | A1 | 4/2018 | Liang et al. |
| 2021/0190664 | A1* | 6/2021 | Duke .............. G06T 3/4007 |
| 2021/0241041 | A1* | 8/2021 | Mounsaveng ......... G06T 3/02 |

FOREIGN PATENT DOCUMENTS

| | | |
|---|---|---|
| JP | 08-110804 | 4/1996 |
| JP | 2001325041 | 11/2001 |
| JP | 2003044665 | 2/2003 |
| JP | 2004240671 | 8/2004 |
| JP | 2004302741 | 10/2004 |
| JP | 2007207173 | 8/2007 |
| JP | 2007522547 | 8/2007 |
| WO | WO 2005/073854 | 8/2005 |
| WO | WO 2010/127039 | 11/2010 |
| WO | WO 2010/127042 | 11/2010 |
| WO | WO 2019/217876 | 11/2019 |

OTHER PUBLICATIONS

Daniel Ho, et al., "Population Based Augmentation: Efficient Learning of Augmentation Policy Schedules," Proceedings of the 36$^{th}$ International Conference on Machine Learning, Long Beach, California, PMLR 97, 2019, arXiv: 1905.05393v1, May 14, 2019, 14 pp.

Ekin D. Cubuk, et al., "RandAugment: Practical automated data augmentation with a reduced search space," arXiv: 1909.13719v2, Nov. 14, 2019, 13 pp.

Ekin D. Cubuk, et al., "AutoAugment: Learning Augmentation Strategies from Data," arXiv: 1805.09501v1, May 2018, later presented in 2019 IEEE/CVF Conference on Computer Vision and Pattern Recognition (CVPR), Jun. 15-20, 2019.

Kenneth O. Stanley and Risto Miikkulainen, "Evolving Neural Networks through Augmenting Topologies," Evolutionary Computation, 10(2): 99-127, MIT 2002, 30 pp.

Ekin D. Cubuk, et al., "AutoAugment: Learning Augmentation Policies from Data," arXiv: 1805.09501v1, May 24, 2018, 14 pp.

"Automating the Art of Data Augmentation, Part III Theory" [online], Feb. 26, 2020 [downloaded Jan. 26, 2021], Edited by Hongyang Zhang, Sharon Li, and Chris Re, Retrieved from the Internet: https://hazyrearch.stanford.edu/data-aug-part-3, 6 pp.

"Automating the Art of Data Augmentation, Part IV New Direction" [online], Feb. 26, 2020 [downloaded Jan. 26, 2021], Edited by Karan Goel, Albert Gu, Sharon Li, and Chris Re, Retrieved from the Internet: https://hazyresearch.stanford.edu/data-aug-part-4, 6 pp.

"Automating the Art of Data Augumentation, Part I Overview" [online], Feb. 26, 2020 [downloaded Jan. 26, 2021], Edited by Sharon Li and Chris Re, Retrieved from the Internet: https://hazyresearch/stanford.edu/data-aug-part-1, 4 pp.

"Automating the Art of Data Augmentation, Part II Practical Methods" [online], Feb. 26, 2020 [downloaded Jan. 26, 2021], Edited by Sharon Li and Chris Re, Retrieved from the Internet: https://hazyresearch.stanford.edu/data-aug-part-2, 6 pp.

Felipe Petroski Such, et al., "Generative Teaching Networks: Accelerating Neural Architecture Search By Learning to Generate Synthetic Training Data," arXiv: 1912.07768v1, Dec. 17, 2019, 26 pp.

Michael Laskin, et al., "Reinforcement Learning with Augmented Data," 34$^{th}$ Conference on Neural Information Processing Systems (NeurIPS 2020), Vancouver, Canada, arXiv: 2004.14990v5, Nov. 5, 2020, 22 pp.

Connor Shorten and Taghi M. Khoshgoftaar, "A survey on Image Data Augmentation for Deep Learning," Journal of Big Data, 6:60, 2019 (https://doi.org/10.1186/s40537-019-0197-0, 48 pp.

Sungbin Lim, et al., "Fast AutoAugment," arXiv: 1905.00397v2, May 25, 2019, 10 pp.

Santiago Gonzalez, et al., "Faster Training by Selecting Samples Using Embeddings," International Joint Conference on Neural Networks, At Budapest Hungary, Jul. 2019.

Gonzalez, et al., "Loss Function Metalearning for Faster, More Accurate Training, and Smaller Datasets," 33$^{rd}$ Conference on Neural Information Processing Systems (NeurIPS 2019).

Zhang, et al., "Mixup: Beyond Empirical Risk Minimization," Conference paper, ICLR, 2018.

"Python vs R for Artificial Intelligence, Machine Learning, and Data Science," by Scenario or Task by Alex Castrounis of Innoarchtech, published online by O'Reilly Media, Copyright InnoArchiTech LLC 2020.

"Production vs Development Artificial Intelligence and Machine Learning," by Scenario or Task by Alex Castrounis of Innoarchtech, published online by O'Reilly Media, Copyright InnoArchiTech LLC 2020.

"Advanced Analytics Packages, Frameworks, and Platforms." by Scenario or Task by Alex Castrounis of Innoarchtech, published online by O'Reilly Media, Copyright InnoArchiTech LLC 2020.

Golovin, et. al., (2017), "Google Vizier: A Service for Black-Box Optimization," Proceedings of the 23rd ACM SIGKDD International Conference on Knowledge Discovery and Data Mining, pp. 1487-1495.

Liang, et. al., (2018), "Evolutionary Architecture Search for Deep Multitask Networks," arXiv: 1803.03745.

Meyerson, et. al., (2018), "Pseudo-task Augmentation: From Deep Multitask Learning to Intrastask Sharing—and Back," arXiv: 1803.04062.

Rawal, et. al., (2018), "From Nodes to Networks: Evolving Recurrent Neural Networks," arXiv: 1803.04439.

Zhang, et al., (2011), "Evolutionary Computation Meets Machine Learning: A Survey," IEEE Computational Intelligence Magazine, vol. 6, No. 4, DOI 10.1109/MCI.2011.942584.

Bergstra, et al., (2013), "Hyperopt: A Python Library for Optimizing the Hyperparameters of Machine Learning Algorithms," Proceedings of the 12$^{th}$ Python in Science Conference (SCIPY 2013).

Gorunescu, et al., "Evolutionary strategy to develop learning-based decision systems, Application to breast cancer and liver fibrosis stadiallization" [online], Jun. 2014 [retrieved on May 21, 2020],

(56) References Cited

OTHER PUBLICATIONS

Journal of Biomedical Informatics, vol. 49, pp. 1-32, Retrieved from the Internet:. https://reader.elsevier.com/reader/sd/pii/S1532046414000173?token=E3DB70CBA3796F20A3C0B08ABA8E0657EED29D4423C65CF9959714AC34AD580F5755F248C38C14CEBE59D726C456A820.

Kaelbling, et al., Reinforcement Learning: A Survey [online], 1996 [retrieved May 21, 2020], Journal of Artificial Intelligence Research, vol. 4, pp. 237-285, Retrieved from the Internet: https://www.cs.cmu.edu/~tom/10701_sp11/slides/Kaelbling.pdf.

International Search Report and Written Opinion for PCT App. No. PCT/US20/25046, dated Jun. 23, 2020, 9 pp.

Alejandro Barredo Arrietz, et al., "Explainable Artificial Intelligence (XAI): Concepts, Taxonomies, Opportunities and Challenges Toward Responsible AI," https://arxiv.org/pdf/1910.10045.pdf, 2019.

European Parliamentary Research Service, "Understanding Algorithmic Decision-Making: Opportunities and Challenges," https://www.europarl.europa.eu/RegData/etudes/STUD/2019/624261/EPRS_STU(2019)624261_EN.pdf, 2019.

Blen M. Keneni, "Evolving Rule Based Explainable Artificial Intelligence for Decision Support System of Unmanned Aerial Vehicles," Evolving Rule Based Explainable Artificial Intelli.pdf, 2018.

Riccardo Guidotti, et al., "A Survey of Methods for Explaining Black Box Models," https://dl.acm.org/doi/fullHtml/10.1145/3236009, 2018.

Ilya Loshchilov, "Surrogate-Assisted Evolutionary Algorithms," https://tel.archives-ouvertes.fr/tel-00823881/document, 2013.

Alan Diaz-Manriquez, et al., "A Review of Surrogate Assisted Multiobjective Evolutionary Algorithms," http://downloads.hindawi.com/journals/cin/2016/9420460.pdf, 2016.

Erwan Le Merrer, et al., "The Bouncer Problem: Challenges to Remote Explainability," https://arxiv.org/pdf/1910.01432.pdf, 2020.

Alain Chabrier, IBM, "Explaining Decision Optimization Prescriptions," https://medium.com/ibm-watson/explaining-decision-optimization-prescriptions-7103abbc44e5, 2019.

Zhiwei Zeng, et al., "Context-Based and Explainable Decision Making With Argumentation," http://ifaamas.org/Proceedings/aamas2018/opdfs/p1114.pdf, 2018.

Jakob Bossek, et al., "One-Shot Decision-Making With and Without Surrogates," https://arxiv.org/pdf/1912.08956v1.pdf, 2019.

Cynthia Rudin, "Stop Explaining Black Box Machine Learning Models for High Stakes Decision and Use Interpretable Models Instead," https://www.nature.com/articles/s42256-019-0048-x, 2019.

Maribel Lopez, "Preparing for AI Ethics and Explainability in 2020,"https://www.forbes.com/sites/maribellopez/2020/01/21/preparing-for-ai-ethics-and-explainability-in-2020/#15b37b022f6e, 2020.

Goodman, et al., "European Union (EU) regulations on algorithmic decision-making and a 'right to explanation,'" arXiv: 1606.08813v3, Aug. 2016.

Qiu, X. et al., Quantifying Point-Prediction Uncertainty in Neural Networks via Residual Estimation with an I/O Kernel, In Proceedings of the Eighth International Conference on Learning Representations (ICLR) (2020).

Hodjat, B. et al., PRETSL: Distributed Probabilistic Rule Evolution for Time-Series Classification, In Genetic Programming Theory and Practice XIV. Springer, 139-148 (2018).

Meyerson, E. et la., Discovering evolutionary stepping stones through behavior domination, In Proceedings of the Genetic and Evolutionary Computation Conference (GECCO 2017).

Miikkulainen, R. et al., Sentient ascend: AI-based massively multivariate conversion rate optimization. In Proceedings of the Thirtieth Innovative Applications of Artificial Intelligence Conference. AAAI (2018).

Miikkulainen et al., Ascend by Evolv: AI-Based Massively Multivariate Conversion Rate Optimization, AI Magazine (2019).

Johnson et al., "Flavor-Cyber-Agriculture: Optimization of plant metabolites in an open-source control environment through surrogate modeling," Plos One (2019), https://doi.org/10.1371/journal.pone.0213918.

Stanley, K. et al, "Designing neural networks through neuroevolution" Nature Machine Intelligence, vol. 1, p. 24-35 (Jan. 2019).

Risto Miikkulainen, "Creative AI Through Evolutionary Computation," arXiv: 1901.03775v2, Feb. 22, 2020.

Diesenroth, M. and Rasmussen, C. E., "PILCO: A model-based and data-efficient approach to policy search," In Proceedings of the $28^{th}$ International Conference on Machine Learning (ICML) (ICML '11), pp. 465-472, 2011.

Ha, D. and Schmidhuber, Jr., "Recurrent World Models Facilitate Policy Evolution," In Advances in Neural Information Processing Systems 32 (NIPS '18), Curran Associates, Inc., Red Hook, NY, USA, pp. 2455-2467, 2018.

Wahlström, N., Schön, T. B., and Deisenroth, M. P., "From pixels to torques: Policy learning with deep dynamical models," arXiv preprint arXiv: 1502.02251, 2015.

Mnih, V., Kavukcuoglu, K., Silver, D., Rusu, A. A., Veness, J., Bellemare, M. G., Graves, A., Riedmiller, M., Fidjeland, A. K., Ostrovski, G., and others, "Human-level control through deep reinforcement learning," Nature 518, 7540, pp. 529-533, 2015.

Hasselt, H. V., "Double Q-learning," In Advances in Neural Information Processing Systems 23, J. D. Lafferty, C. K. I. Williams, J. Shawe-Taylor, R. S. Zemel, and A. Culotta (Eds.), Curran Associates, Inc., pp. 2613-2621, 2010.

Wang, Z., Schaul, T., Hessel, M., Van Hasselt, H., Lanctot, M., and De Freitas, "Dueling Network Architectures for Deep Reinforcement Learning," In Proceedings of the $33^{rd}$ International Conference on Machine Learning (ICML) (ICML '16), vol. 48, JMLR org., 1995-2003.

Mnih, V., Badia, A. P., Mirza, M., Graves, A., Lillicrap, T., Harley, T., Silver, D., and Kavukcuoglu, "Asynchronous methods for deep reinforcement learning," (ICML) (ICML '16), pp. 1928-1937, 2016.

Schulman, J., Wolski, F., Dhariwal, P., Radford, A., and Klimov, O., "Proximal Policy Optimization Algorithms," CoRR abs/1707.06347, 2017.

Houthooft, R., Chen, Y., Isola, P., Stadie, B., Wolski, F., Ho, O. J., and Abbeel, P., "Evolved policy gradients," In Advances in Neural Information Processing Systems 31, Curran Associates, Inc., pp. 5400-5409, 2018.

Khadka, et al., "Evolution-Guided Policy Gradient in Reinforcement Learning," $32^{nd}$ Conference on Neural Information Processing Systems, 2018.

Pourchot, et al., "CEM-RL: Combining Evolutionary and Gradient-Based Methods for Policy Search," ICLR, 2019.

Application as filed for U.S. Appl. No. 16/424,686, filed May 29, 2019.

Application as filed for U.S. Appl. No. 16/502,439, filed Jul. 3, 2019.

Application as filed for U.S. Appl. No. 16/879,934, filed May 21, 2020.

Hodjat, et al., "Chapter 5: Introducing an Age-Varying Fitness Estimation Function," Genetic Programming Theory and Practice X, Ed. Riolo, et al., Springer, Apr. 19, 2013, pp. 59-71.

Li, Xiaodong and Kirley, Michael, "The Effects of Varying Population Density in a Fine-Grained Parallel Genetic Algorithm," 2002, CEC'02, Proceedings of the 2002 Congress on Evolutionary Computation, vol. 2. IEEE, 2002.

Fidelis, Marcos Vinicius, Heitor S. Lopes, and Alex A. Freitas, "Discovering Comprehensible Classification Rules With a Genetic Algorithm," Proceedings of the 2000 Congress on Evolutionary Computation, vol. 1, IEEE, 2000.

International Search Report and Written Opinion for PCT Application No. PCT/US2008/82876, Dec. 23, 2008, 8 pp.

Koza, J. R., "Genetic Programming: On the Programming of Computers by Means of Natural Selection," Dec. 1992, MIT Press, pp. 1-609.

Extended European Search Report for EP Application No. EP 08847214, 9 pp.

(56) References Cited

OTHER PUBLICATIONS

Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.
Tanev, I., et al., "Scalable Architecture For Parallel Distributed Implementation of Genetic Programming on Network of Workstations," J. Systems Architecture, vol. 47, Jul. 2001, pp. 557-572.
Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 p., Retrieved from the Internet: http:/www.ra.cs.uni-tuegingen.de/mitarb/streiche/publications/Introduction_to_E_volutionary_Algorithms.pdf.
Written Opinion from Singapore Patent Office in related application SG 201003127-6, Jun. 16, 2011, 9 pp.
Exam Report for related application AU 2008323758, Apr. 20, 2012, 2 pp.
Office Action from JP 2010-533295, dated Apr. 16, 2013, 12 pp.
Laumanns, Marco, et al., "A Unified Model for Multi-Objective Evolutionary Algorithms with Elitism." IEEE, pp. 46-53, 2000.
Ahn, Change Wook, et al., "Elitism-Based Compact Genetic Algorithms," IEEE, Transactions on Evolutionary Computation, vol. 7, No. 4, pp. 367-385, 2003.
Hornby, Gregory S., "The Age-Layered Population Structure (ALPS) Evolutionary Algorithm," ACM, GECCO '09, 7 pp., 2009.
Hornby, G. S., "ALPS: The Age-Layered Population Structure for Reducing the Problem of Premature Convergence," GECCO '06, Seattle, Jul. 2006, authored by an employee of the U.S. Government, therefore in the public domain, 8 pp.
Hornby, G. S. "A Steady-State Version of the Age-Layered Population Structure EA," Chapter 1 of Genetic Programming Theory and Practice VII, Riolo, et al., editors, Springer 2009, 16 pp.
Hornby, G. S., "Steady-State ALPS for Real-Valued Problems," GECCO '09, Montreal, Jul. 2009, Assoc. of Computing Machinery, 8 pp.
Idesign lab, "ALPS—The Age-Layered Population Structure," UC Santa Cruz web article printed Mar. 17, 2011, 3 pp., http://idesign.ucsc.edu/alsp.html.
Gaspar-Cunha, A., et al., "A Multi-Objective Evolutionary Algorithm Using Neural Networks to Approximate Fitness Evaluations," Int'l. J. Computers, Systems and Signals, 6(1), pp. 18-36, 2005.
Kosorukoff, A., "Using Incremental Evaluation and Adaptive Choice of Operators in a Genetic Algorithm," Proc. Genetic and Evolutionary Computation Conference, GECCO, Sep. 2002, 7 pp.
Nelson, A., "Fitness Functions in Evolutionary Robotics: A Survey and Analysis," Robotics and Autonomous Systems 57, 2009, 345-370.
Wu, A. S., et al., "An Incremental Fitness Function for Partitioning Parallel Tasks," Proc. Genetic and Evolutionary Computation Conf., Aug. 2001. 8 pp.
Whitehead, B. A., "Genetic Evolution of Radial Basis Function Coverage Using Orthogonal Niches," IEEE Transactions on Neural Networks, 7:6, Nov. 1996, 1525-28.
Bui, L. T., et al., "Local Models: An Approach to Distributed Multi-Objective Optimization," Computational Optimization and Applications, vol. 42, No. 1, Oct. 2007, pp. 105-139.
Castillo, Tapia M. G., et al., "Applications of Multi-Objective Evolutionary Algorithms in Economics and Finance: A Survey," Proc. IEEE Congress on Evolutionary Computation, Sep. 2007, pp. 532-539.
Ducheyne, E., et al., "Is Fitness Inheritance Useful for Real-World Applications?," Evolutionary Multi-Criterion Optimization, ser. LNCS 2631. Spring 2003, pp. 31-42.
Gopalakrishnan, G., et al., "Optimal Sampling in a Noisy Genetic Algorithm for Risk-Based Remediation Design," Bridging the Gap: Meeting the World's Water and Environmental Resources Challenges, Proc. World Water Congress, 2001, 8 pp.
Juille, H., "Evolution of Non-Deterministic Incremental Algorithms as a New Approach for Search in State Spaces," Proc. $6^{th}$ Int'l. Conf. on Genetic Algorithms, 1995 8 pp.
International Search Report mailed Jul. 2, 2010 in PCT/US10/32847.
International Search Report mailed Jun. 29, 2010 in PCT/US10/32841.
Sacks, J., et al., "Design and Analysis of Computer Experiments," Statistical Science, 4:4. 1989. 409-435.
Torresen, J., "A Dynamic Fitness Function Applied to Improve the Generalisation When Evolving a Signal Processing Hardware Architecture," Proc. EvoWorkshops, 2002, 267-299 (12 pp.).
Bartlett II, J. E., et al., "Organizational Research: Determining Appropriate Sample Size in Survey Research," IT, Learning, and Performance Journal, 19(1), Spring 2001, 8 pp.
Fitzpatrick, J. M., et al., "Genetic Algorithm in Noisy Environments," Machine Learning 3:101-120, May 1988.
Leon, C., et al., "Parallel Hypervolume-Guided Hyperheuristic for Adapting the Multi-Objective Evolutionary Island Model," Proc. $3^{rd}$ Int'l. Workshop on Nature Inspired Cooperative Strategies for Optimization Studies in Computational Intelligence, vol. 236, Nov. 2008, pp. 261-272.
Lopez, Jaimes A., et al., "MRMOGA: Parallel Evolutionary Multiobjective Optimization Using Multiple Resolutions," Proc. IEEE Congress on Evolutionary Computation, vol. 3, Sep. 2005, pp. 2294-2301.
Davarynejad, M., et al., "A Novel General Framework for Evolutionary Optimization: Adaptive Fuzzy Fitness Granulation," CEC, Sep. 2007, 6 pp.
Davarynejad, M., "Fuzzy Fitness Granulation in Evolutionary Algorithms For Complex Optimization," Master of Science Thesis, Ferdowsi Univ. of Mashhad, Jun. 2007, 30 pp.
Salami, M., et al., "A Fast Evaluation Strategy for Evolutionary Algorithms," Applied Soft Computing 2/3F (2003), 156-173.
M.-R. Akbarzadeh-T., et al., "Friendship Modeling for Cooperative Co-Evolutionary Fuzzy Systems: A Hybrid GA-GP Algorithm," Proc. $22^{nd}$ Int'l. Conf. of N. American FIPS, Jul. 2003, pp. 61-66.
Mouret, J. B., et al., "Encouraging Behavioral Diversity in Evolutionary Robotics: An Empirical Study," MIT, Evolutionary Computation, 20(1):91-133, 2012.
Myers, Raymond H. and Montgomery, Douglas C., "Response Surface Methodology: Process and Product Optimization Using Designed Experiments," John Wiley and Sons, Inc., New York, 1995.
Poli, R., et al., "Genetic Programming: An Introductory Tutorial and a Survey of Techniques and Applications," Univ. Essex School of Computer Science and Electronic Engineering Technical Report No. CES-475, Oct. 2007, 112 pp.
Georgilakis, P. S., "Genetic Algorithm Model for Profit Maximization of Generating Companies in Deregulated Electricity Markets," Applied Artificial Intelligence, Jul. 2009, 23:6, 538-552.
Refaeilzadeh, P., et al., "Cross Validation," entry, Encyclopedia of Database Systems, eds. Ozsu and Liu, Springer, 2009, 6 pp.
Remde, S., et al., "Evolution of Fitness Functions to Improve Heuristic Performance," LION, Dec. 8-10, 2007 II, LNCS 5313, pp. 206-219.
Schoreels, C., "Agent Based Genetic Algorithm Employing Financial Technical Analysis For Making Trading Decisions Using Historical Equity Market Data," IEEE/WIC/ACM International Conference on Intelligent Agent Technology (IAT2004), Beijing, China. Sep. 20-24, 2004, pp. 421-424.
Bongard, J. C., et al., "Guarding Against Premature Convergence While Accelerating Evolutionary Search," GECCO '10: Proceedings of the $12^{th}$ Annual Conference on Genetic and Evolutionary Computation, 8 pp. (2010).
Application as filed for U.S. Appl. No. 16/902,013, filed Jun. 15, 2020, 14 pp.

* cited by examiner

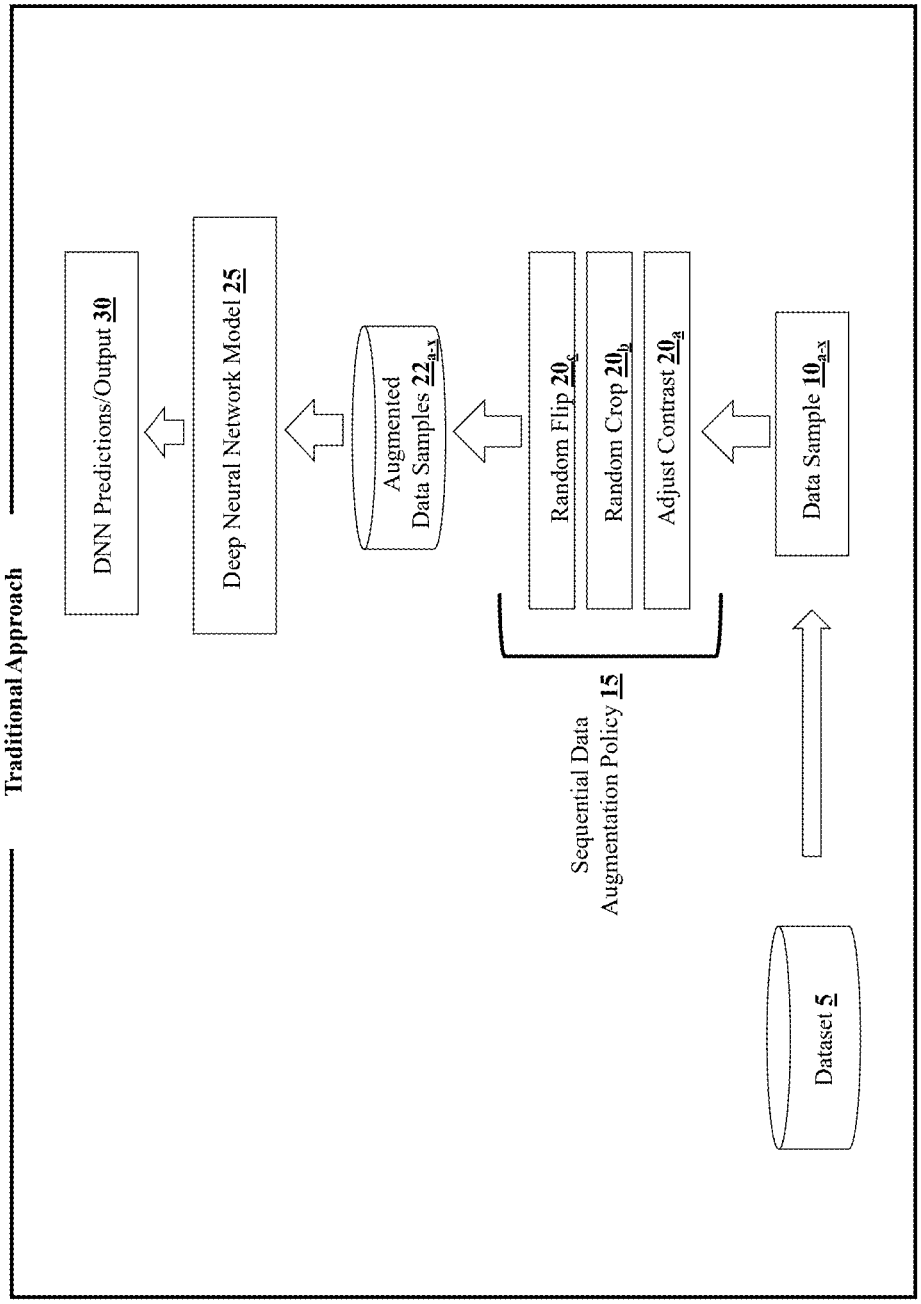
FIG. 1: PRIOR ART

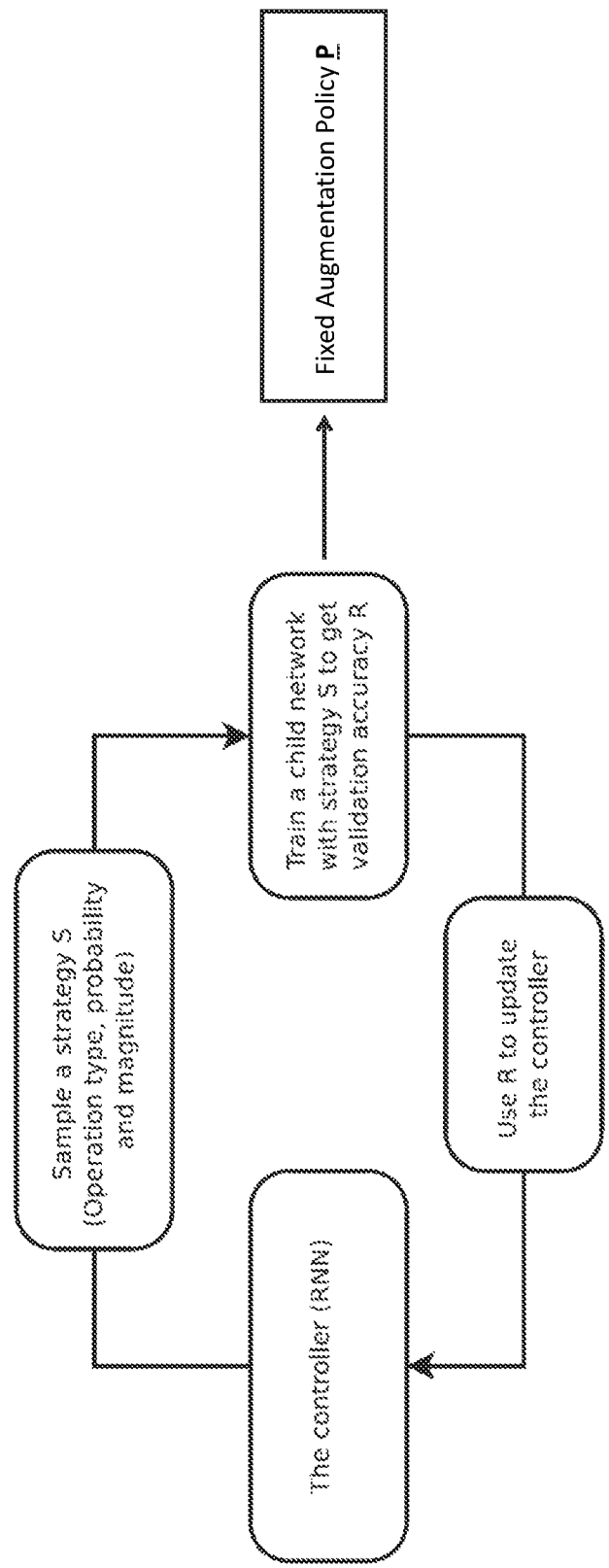
FIG. 2: PRIOR ART

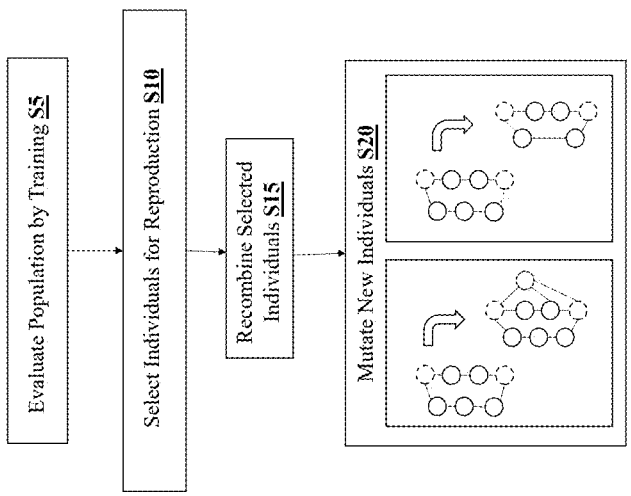
FIG. 3C
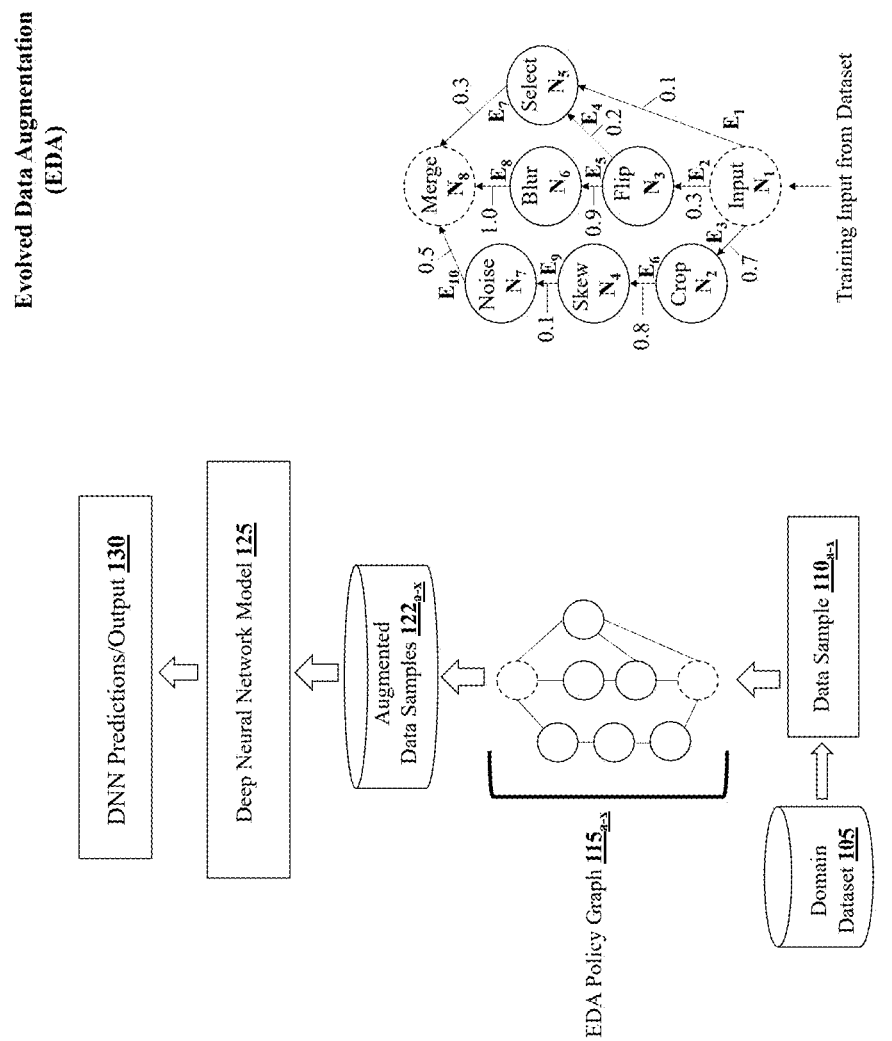
FIG. 3B
FIG. 3A

SYSTEM AND METHOD FOR EVOLVED DATA AUGMENTATION AND SELECTION

CROSS REFERENCE TO RELATED APPLICATIONS

This application claims benefit of priority to U.S. Provisional Patent Application No. 62/987,138 entitled SYSTEM AND METHOD FOR EVOLVED DATA AUGMENTATION AND SELECTION, filed Mar. 9, 2020 which is incorporated herein by reference in its entirety.

This application cross-references and incorporates by reference herein in its entirety, U.S. patent application Ser. No. 16/831,550 entitled OPTIMIZATION ENGINE WITH EVOLUTIONARY SURROGATE-ASSISTED PRESCRIPTIONS, which was filed on Mar. 26, 2020 and U.S. patent application Ser. No. 16/424,686 entitled SYSTEMS AND METHODS FOR PROVIDING SECURE EVOLUTION AS A SERVICE, which was filed on May 29, 2019.

Additionally, the following publications are also incorporated herein by reference: Gonzalez and Miikkulainen, "Loss Function Metalearning for Faster, More Accurate Training, and Smaller Datasets," 33rd Conference on Neural Information Processing Systems (NeurIPS 2019) and Santiago Gonzalez, Joshua Landgraf and Risto Miikkulainen, "Faster Training by Selecting Samples Using Embeddings," International Joint Conference on Neural Networks, At Budapest, Hungary, July 2019. The articles list overlapping inventors and provide additional description and support for one or more of the embodiments herein.

FIELD OF THE TECHNOLOGY

Generally, the field of technology is data augmentation for use in model training.

DESCRIPTION OF THE RELATED ART

The goal in training a machine learning model, is to tune, i.e. optimize, the model's parameters such that it can map a particular input (image, video, text, etc.) to some prediction/output (e.g., category, class, other label) with high accuracy, i.e., minimal loss. If there are many parameters, the model should have a proportional number of examples, i.e., input data, to maximize performance. And the number of parameters is likewise proportional to the complexity of the task the model has to perform. State of the art neural networks typically have parameters on the order of millions.

Available data sets are often too small in proportion to the complexity of the task and the number of parameters. Accordingly, data augmentation techniques are implemented to expand the size of the input data set. Such techniques, which are domain dependent, including operations such as flipping, translation, rotation, scaling, cropping, Gaussian noise can be applied to the original input data set to produce additional data sets.

Alternatively, data augmentation techniques can also be used on large data sets to increase or filter in the relevant data (and filter out the irrelevant data). Although the idea of a data set being too large seems to contradict the statements above, one skilled in the art recognizes the significant drawbacks to data sets that are too large and contain irrelevant data. Such datasets increase the training time, particularly when used to train more and more sophisticated and complex models. And this becomes an even greater consideration for machine learning systems based on evolutionary computation, where similar networks need to be trained dozens of times.

But until very recently, existing data augmentation pipelines were linear, and only used a fixed, very limited number of operations in a prespecified order. Further, these simple pipelines do not have enough expressive power to deal with complex datasets. Additionally, the data augmentation pipeline is usually manually designed, including the hyperparameters for each operation and the order in which they are applied. Data augmentation pipelines do not adapt to the domain at hand. Further still, most data augmentation is separate from the rest of the model, meaning that it happens as a preprocessing step. This separation may limit the effectiveness of the data augmentation in combination with the actual model. FIG. 1 illustrates an exemplary prior art data augmentation system which includes a fixed augmentation policy 15 exemplified by specific ordered operations acting on each original sample $10_{a-x}$. In this example, the operations include, in order: adjust contrast $20_a$, random crop $20_b$, and random flip $20_c$, before passing the augmented sample data to the DNN model 25 to produce a prediction/outcome 30.

Recently, responsive to the continued development of deep neural networks, data augmentation techniques have continued to evolve. In 2019, Cubuk et al., presented a conference paper directed to an automated data augmentation process, AutoAugment, which is described in "AutoAugment: Learning Augmentation Strategies from Data," initial version published in May 2018 in arXiv: 1805.09501v1 and later presented in 2019 IEEE/CVF Conference on Computer Vision and Pattern Recognition (CVPR) (Jun. 15 2019 to Jun. 20 2019). Referring to FIG. 2, AutoAugment consists of two components: a search algorithm and a search space. At a high level, the search algorithm, a reinforcement learning algorithm (implemented as a controller RNN), samples a data augmentation policy S, which has information about what image processing operation to use, the probability of using the operation in each batch, and the magnitude of the operation. Cubuk identifies a key feature of AutoAugment as the fact that the final policy S will be used to train a neural network with a fixed architecture, whose validation accuracy R will be sent back to update the controller. Since R is not differentiable, the controller will be updated by policy gradient methods. Cubuk tests models P trained with AutoAugment on well-known image classification datasets and achieves improved results over state-of-the-art models. AutoAugment requires a separate search phase on a proxy task which increases training complexity and computational cost, particularly when applied on a larger scale. Further, the need for a separate search phase limits AutoAugment's ability to adjust for model size and dataset.

In an effort to improve upon and/or address certain limitations of AutoAugment, revised approaches to automated data augmentation are discussed in the literature. For example, Ho et al. developed a method which they call population based augmentation (PBA) which learns a schedule of augmentation policies as opposed to the fixed policy of AutoAugment. PBA is described in "Population Based Augmentation: Efficient Learning of Augmentation Policy Schedules," published in May 2019 in arXiv:1905.05393v1 and is based on a hyperparameter search algorithm, Population Based Training (PBT), which optimizes the parameters of a network jointly with their hyperparameters to maximize performance. The output of PBT is not an optimal hyperparameter configuration but rather a trained model and schedule of hyperparameters. This learned augmentation schedule can then be used to improve the training of different (i.e., larger and costlier to train) models on the same dataset.

And in "RandAugment: Practical automated data augmentation" authored by Cubuk et al. and published in November 2019 at arXiv:1909.13719v2, the separate search phase is eliminated by folding the parameters for the data augmentation strategy into the hyper-parameters for training a model. The focus of this process is on reducing the parameter space for data augmentation by implementing a unified optimization of the model weights and data augmentation policy.

The present embodiments also address the existing need in the art for a system and process for augmenting data in accordance with domain characteristics in order to improve model tuning.

SUMMARY

In a first exemplary embodiment, a process for evolving a data augmentation policy for application to sample data from a dataset, wherein the sample data is used to train a neural network to perform a predetermined task, includes: evolving an initial population of candidate data augmentation policy models, wherein each initial candidate data augmentation policy model includes multiple nodes and multiple edges and further wherein each node represents a single distinct data augmentation operation, and each edge indicates a weight between two nodes, the weight representing a probability related to action by a second node on input data from a first node; evaluating each initial candidate data augmentation policy model by:
  i. applying each initial candidate data augmentation policy to the sample data to produce an augmented dataset;
  ii. at least partially training the neural network using the augmented sample dataset;
  iii. determining a fitness for each initial candidate data augmentation policy model,
wherein the candidate data augmentation policy model's fitness is accuracy of the at least partially trained neural network on a held-out validation dataset from the dataset; selecting one of (a) a final evaluated data augmentation policy or (b) one or more evaluated initial candidate data augmentation policy models for reproduction on the basis of determined fitness; upon selection of (b), reproducing child candidate data augmentation policy models from the selected one or more evaluated initial candidate data augmentation policy models; and
repeating evaluating and selecting for the child candidate data augmentation policy models until resulting selection is (a).

A computer-readable medium storing instructions that, when executed by a computer, perform a process for evolving a data augmentation policy for application to sample data from a dataset, wherein the sample data is used to train a neural network to perform a predetermined task, including: evolving an initial population of candidate data augmentation policy models, wherein each initial candidate data augmentation policy model includes multiple nodes and multiple edges and further wherein each node represents a single distinct data augmentation operation, and each edge indicates a weight between two nodes, the weight representing a probability related to action by a second node on input data from a first node; evaluating each initial candidate data augmentation policy model by:
  i. applying each initial candidate data augmentation policy to the sample data to produce an augmented dataset;
  ii. at least partially training the neural network using the augmented sample dataset;
  iii. determining a fitness for each initial candidate data augmentation policy model,
wherein the candidate data augmentation policy model's fitness is accuracy of the at least partially trained neural network on a held-out validation dataset from the dataset; selecting one of (a) a final evaluated data augmentation policy or (b) one or more evaluated initial candidate data augmentation policy models for reproduction on the basis of determined fitness; upon selection of (b), reproducing child candidate data augmentation policy models from the selected one or more evaluated initial candidate data augmentation policy models; and
repeating evaluating and selecting for the child candidate data augmentation policy models until resulting selection is (a).

A process for evolving a data augmentation policy for application to sample data from a dataset, wherein the sample data is used to train a neural network to perform a predetermined task, the process including: evolving an initial population of candidate data augmentation policy models, wherein each initial candidate data augmentation policy model includes multiple nodes and multiple edges and further wherein each node represents a single distinct data augmentation operation, and each edge indicates a weight between two nodes, the weight representing a probability related to action by a second node on input data from a first node; evaluating each initial candidate data augmentation policy model by:
  i. applying each initial candidate data augmentation policy to the sample data to produce an augmented dataset;
  ii. at least partially training the neural network using the augmented sample dataset;
  iii. determining a fitness for each initial candidate data augmentation policy model,
wherein the candidate data augmentation policy model's fitness is accuracy of the at least partially trained neural network on a held-out validation dataset from the dataset; selecting one of (a) a final evaluated data augmentation policy or (b) one or more evaluated initial candidate data augmentation policy models for reproduction on the basis of determined fitness; upon selection of (b), reproducing child candidate data augmentation policy models from the selected one or more evaluated initial candidate data augmentation policy models; and
repeating evaluating and selecting for the child candidate data augmentation policy models until resulting selection is (a).

BRIEF DESCRIPTION OF FIGURES

FIG. 1 illustrates a first exemplary prior art system and process which utilizes a previously known sequential data augmentation policy;

FIG. 2 illustrates a second exemplary prior art system and process which incorporates a search algorithm to sample a data augmentation policy, train a child network to get validation accuracy and use accuracy to update the search algorithm in a feedback process for determining a final, fixed augmentation policy; and FIGS. 3A, 3B, 3C illustrate a system and process which modifies different aspects of a model's training data to achieve different objectives in accordance with the novel embodiments described herein.

DESCRIPTION OF EMBODIMENTS

Generally, the embodiments herein describe an evolutionary system that modifies different aspects of a model's training data (also referenced as "sample" or "input" herein) to achieve different objectives. The embodiments seek to leverage the limited data that is available in different ways that may be more optimal. These aspects can be evolved to optimize against one or more objectives (which need not be differentiable), such as fairness, explainability, adversarial robustness, training time, safety, performance, regularization, and model accuracy.

The techniques which may be applied to modify the training data might include one or more of the following:

Data augmentation: Data augmentation helps to make deep neural networks generalize better by regularizing against noise. In addition to the exemplary references discussed in the Description of the Related Art, a detailed survey of data augmentation techniques for deep learning in the image domain can be found in Shorten et al., "A survey on Image Data Augmentation for Deep Learning," J Big Data (2019) 6:60, the contents of which is incorporated herein by reference in its entirety.

Data preprocessing: Pre-processing helps the optimization process by keeping gradients small. For example, normalizing pixel variance in each sample image.

Data synthesis: An example of data synthesis in described in "Generative Teaching Networks: Accelerating Neural Architecture Search by Learning to Generate Synthetic Training Data" (Petroski et al., arXiv:1912.07768 (December 2019)) which discloses that generative teaching networks were able to improve model performance by synthesizing unique samples that do not resemble the modes in the training data. Additionally, the concept referred to as Mixup, which is described in Zhang et al, "Mixup: BEYOND EMPIRICAL RISK MINIMIZATION," Conference paper ICLR 2018, is another example of a data synthesis process that has been applied to augment input data.

Sample weighting: Different samples might need to be weighted more heavily than others when training. For example, infrequent modes in the training data might need to be emphasized to balance the dataset.

Sample selection or masking: Training can be accelerated by only presenting a subset of samples that will have the greatest impact. Sample selection can also be applied to multi-task/transfer learning domains, where we want to extract the samples that will best set the network up for success in adapting to new tasks or fine-tuning.

Trained models can also be evaluated using some of the above-identified techniques by modifying aspects of the validation data set in accordance with one or more of the techniques referenced above. For example, performing validation with masked subsets of the validation dataset can be used to check the model's fairness across protected categories. For example, a model that operates on personnel data can be disjointly validated on different races or genders to ensure fairness. This can then be used as an objective for evolving different aspects of training.

In the preferred embodiments, a process called Evolved Data Augmentation (EDA) can represent more sophisticated data augmentation policies by leveraging a graph representation to compose simple operations into more complex ones. The EDA process adapts to both the domain (dataset) and the network architecture to maximize generalization and automatically determines what correct hyperparameters to use. EDA facilitates evolution of novel data augmentation pipelines that can utilize many different types of exotic operations without any human bias. The EDA process facilitates interleaving of data augmentation operations into the model and allows for operations to be applied to intermediate outputs of layers. EDA can build policies that provide more than one input to the network, possibly helping training (e.g., have low resolution and high resolution versions of an input).

In an exemplary embodiment shown in FIG. 3A, each evolved EDA policy $115_{a-x}$ is used to augment input training data samples $110_{a-x}$ from the domain dataset 105 and the augmented data samples $122_{a-x}$ are provided as the input to train DNN model 125 which makes predictions 130. In the particular example discussed here, the evolved EDA policies $115_{a-x}$ are evolved such that they augment the data samples $110_{a-x}$ for particular data selection/data weighting, i.e. sample selection.

In the present embodiments, a graph-based approach (focusing on Data Augmentation) uses NEAT (a topology and weight evolving artificial neural network (TWEANN)) to evolve an arbitrary graph, i.e., model, that represents the data augmentation policy $115_{a-x}$. A description of NEAT may be found in the reference to Stanley, et al., Evolving Neural Networks through Augmenting Topologies, Evolutionary Computation 10 (2): 99-127, MIT 2002, which is incorporated herein by reference in its entirety, and in other references known to those skilled in the art. Numerous EDA policy models are initialized from a minimal topology and complexified through mutation and crossover operations that randomly insert nodes $N_{1-x}$ and edges $E_{1-x}$ to produce a population of candidate EDA policy models.

In the present exemplary embodiment of FIG. 3B, each node $N_{1-x}$ represents a single distinct data augmentation operation which transform data, and each edge $E_{1-x}$ identifies the weight between two nodes, weight representing the probability that the second node operation is applied after the first one. So, for example, after Input node $N_1$, edge $E_1$ includes weight probability of 0.1 that the next operation will be Select at $N_5$, edge $E_2$ includes weight probability of 0.3 that the next operation will be Flip at $N_3$, and edge $E_3$ includes weight probability of 0.7 that the next operation will be Crop at $N_2$.

Where multiple nodes converge onto one unary node (such as the final node), edge weights determine the relative probabilities of each input being used. In the example in FIG. 3B, this is exemplified where nodes $N_1$ and $N_3$ both converge on $N_5$. The probability that the input from $N_1$ will be Selected is 0.1 as per $E_1$ and the probability that the input from $N_3$ will be Selected is 0.2 as per $E_4$. Operations from multiple nodes can be merged by either randomly selecting the output of a node or by doing a smoothing/averaging of all the outputs (i.e. Mixup).

In accordance with evolutionary processes generalized in FIG. 3C with reference to the system of FIG. 3A, each candidate in the population of candidate EDA policy models $115_{a-x}$ is first evaluated by either fully or partially training a neural network 125 using the augmented datasets $122_{a-x}$ generated by the candidate policy (FIG. 3C), S5. As part of the evaluation S5, each individual candidate's fitness is determined. For the present embodiment, fitness can be, for example, the accuracy of the trained model 125 on a separate validation dataset held out from the domain dataset 105. Using predetermined fitness metrics, certain individual candidates are selected for reproduction S10 (also called procreation). Selected candidates, also called parent candidates, may be combined in various ways to form child candidates S15 and resulting child candidates may also be mutated S20. The process of training, evaluation, selection and combination/mutation repeats until a candidate EDA policy model reaches a predetermined metric for production. Co-owned U.S. Published Patent Application No. 2018/0114115 which names overlapping inventors and is incorporated herein by reference in its entirety, provides a detailed description of various features and implementations of the generalized process steps identified in FIG. 3C. U.S. Published Patent Application No. 2018/0114115 also describes additional features and modules which may be incorporated in the system for executing the process of FIG. 3C.

In a preferred embodiment, the population of candidate EDA policy models $115_{a-x}$ are divided according to their structure into subpopulations called species and each species is evolved independently. By way of example, the subpopulations may be formed by grouping candidate models in accordance with similarities between their evolved topologies. A general description of a system and process which includes speciation is described in U.S. Published Patent Application No. 2018/0114115. The independent evolution of species protects newly innovated data augmentation policies from competition. Some exemplary, but non-limited, operations that can be used in model nodes include: Pixelwise arithmetic, Downsampling, Blurring, Cropping, Affine transforms (i.e., flips, scales, skews, rotations, translations), Noise injection, Contrast/brightness adjustment and Tone-mapping. The EDA policy model evolution is applicable to different domains including, but are not limited to, imaging, text, time series, speech.

The exemplary embodiment furthers key objectives in modern ML/AI systems including: accuracy, explainability, performance, fairness, safety, adversarial robustness, training time, and regularization. Specifically, the exemplary embodiment describes an automatic way of preventing overfitting of training set and helping to regularize the model and improve generalization. The exemplary embodiment transforms existing training samples (data) to get augmented samples (data) that are more well-suited to learning, thus speeding up training. The exemplary embodiment is well-suited for deep neural networks (DNNs) that are difficult to optimize by hand and also novel datasets where the optimal data augmentation policy is not well known. Implementing the present embodiment as part of an AutoML system can improve upon automatically adapting to the user's requirements. The exemplary embodiment reduces training time by only training with useful samples. Sample selection can also aid in explainability, fairness, and adversarial robustness by automatically rebalancing imbalanced data sets. Exemplary AutoML systems and processes which may incorporate the present embodiment or variations thereof are described in the following co-owned patent applications which are incorporated herein by reference herein in their entireties: U.S. patent application Ser. No. 16/424,686 entitled Systems And Methods For Providing Secure Evolution As A Service; U.S. patent application Ser. No. 16/502,439 entitled Systems And Methods For Providing Data-Driven Evolution Of Arbitrary Data Structures; U.S. patent application Ser. No. 16/831,550, entitled Process And System Including An Optimization Engine With Evolutionary Surrogate-Assisted Prescriptions; and Ser. No. 16/902,013 entitled Process And System Including Explainable Prescriptions Through Surrogate-Assisted Evolution.

In further embodiments implementing the exemplary process above, model architecture and data augmentation can be evolved at the same time to maximize performance. Further, learning on evolved augmentation policies may be transferred to unseen domains and datasets. Adapting an evolved policy to a new problem with relatively little compute may be accomplished. Further still, generation of data augmentation/data selection policies/schedules that change over the course of training may be performed. For example, combining population based training with EDA.

It is submitted that one skilled in the art would understand that various computing environments, including computer readable mediums, which may be used to implemented the methods described herein. Selection of computing environment and individual components may be determined in accordance with memory requirements, processing requirements, security requirements and the like. It is submitted that one or more steps or combinations of step of the methods described herein may be implemented locally or remotely, i.e., on a remote physical computer or virtual machine (VM). Virtual machines may be hosted on cloud-based IaaS platforms such as Amazon Web Services (AWS) and Google Cloud Platform (GCP), which are configurable in accordance with memory, processing, and data storage requirements. One skilled in the art further recognizes that physical and/or virtual machines may be servers, either stand-alone or distributed. Distributed environments many include coordination software such as Spark, Hadoop, and the like. For additional description of exemplary programming languages, development software and platforms and computing environments which may be considered to implement one or more of the features, components and methods described herein, the following articles are incorporated herein by reference in their entirety: Python vs R for Artificial Intelligence, Machine Learning, and Data Science; Production vs Development Artificial Intelligence and Machine Learning; Advanced Analytics Packages, Frameworks, and Platforms by Scenario or Task by Alex Castrounis of Innoarchtech, published online by O'Reilly Media, Copyright Inno-ArchiTech LLC 2020.

The invention claimed is:

1. A process for evolving a data augmentation policy for application to sample data from a dataset, wherein the sample data is used to train a deep neural network (DNN) to perform a predetermined task, the process comprising:

evolving an initial population of candidate data augmentation policy models, wherein each initial candidate data augmentation policy model includes multiple nodes and multiple edges and further wherein each node represents a single distinct data augmentation operation, and each edge indicates a weight between two nodes, the weight representing a probability related to action by a second node on input data from a first node;

evaluating each initial candidate data augmentation policy model by:
  i. applying each initial candidate data augmentation policy to the sample data to produce an augmented dataset;
  ii. at least partially training the deep neural network (DNN) using the augmented sample dataset;
  iii. determining a fitness for each initial candidate data augmentation policy model, wherein the candidate data augmentation policy model's fitness is accuracy of the at least partially trained deep neural network (DNN) on a held-out validation dataset from the dataset;

selecting one of (a) a final evaluated data augmentation policy or (b) one or more evaluated initial candidate data augmentation policy models for reproduction on the basis of determined fitness;

upon selection of (b), reproducing child candidate data augmentation policy models from the selected one or more evaluated initial candidate data augmentation policy models; and repeating evaluating and selecting for the child candidate data augmentation policy models until resulting selection is (a), wherein the initial population is separated into subpopulations of candidate data augmentation policy models in accordance with similarity between candidate topologies and each subpopulation is separately subjected to the evaluating, the selecting and the repeating;

applying the final evaluated data augmentation policy on sample data;

training the deep neural network using the sample data on which the final evaluated data augmentation policy has been applied.

2. The process according to claim 1, wherein the single distinct data augmentation operations are selected from the group consisting of: pixel-wise arithmetic; downsampling; blurring; cropping; affine transforms; noise injection; contrast adjustment; and tonemapping.

3. The process according to claim 1, wherein the probability related to action by a second node on input data from a first node indicates a probability that a second node operation is applied after a first node operation in a case where there is a single first node converges on a second node.

4. The process according to claim 1, wherein the probability related to action by a second node on input data from a first node indicates a probability that an input from the first node will be used by the second node in a case where there are multiple first nodes converging on a single second node.

5. The process according to claim 1, wherein the dataset includes data from one of the following domains imaging, text, time series, speech.

6. The process according to claim 1, wherein the reproducing child candidate data augmentation policy models includes at least one of recombining and mutating the selected one or more evaluated initial candidate data augmentation policy models.

7. A non-transitory computer-readable medium storing instructions that, when executed by a computer, perform a process for evolving a data augmentation policy for application to sample data from a dataset, wherein the sample data is used to train a deep neural network (DNN) to perform a predetermined task, comprising:

evolving an initial population of candidate data augmentation policy models, wherein each initial candidate data augmentation policy model includes multiple nodes and multiple edges and further wherein each node represents a single distinct data augmentation operation, and each edge indicates a weight between two nodes, the weight representing a probability related to action by a second node on input data from a first node;

evaluating each initial candidate data augmentation policy model by:

i. applying each initial candidate data augmentation policy to the sample data to produce an augmented dataset;

ii. at least partially training the deep neural network (DNN) using the augmented sample dataset;

iii. determining a fitness for each initial candidate data augmentation policy model, wherein the candidate data augmentation policy model's fitness is accuracy of the at least partially trained deep neural network (DNN) on a held-out validation dataset from the dataset;

selecting one of (a) a final evaluated data augmentation policy or (b) one or more evaluated initial candidate data augmentation policy models for reproduction on the basis of determined fitness;

upon selection of (b), reproducing child candidate data augmentation policy models from the selected one or more evaluated initial candidate data augmentation policy models; and repeating evaluating and selecting for the child candidate data augmentation policy models until resulting selection is (a), wherein the initial population is separated into subpopulations of candidate data augmentation policy models in accordance with similarity between candidate topologies and each subpopulation is separately subjected to the evaluating, the selecting and the repeating;

applying the final evaluated data augmentation policy on sample data;

training the deep neural network using the sample data on which the final evaluated data augmentation policy has been applied.

8. The non-transitory computer readable medium according to claim 7, wherein the single distinct data augmentation operations are selected from the group consisting of: pixel-wise arithmetic; downsampling; blurring; cropping; affine transforms; noise injection; contrast adjustment; and tonemapping.

9. The non-transitory computer readable medium according to claim 7, wherein the probability related to action by a second node on input data from a first node indicates a probability that a second node operation is applied after a first node operation in a case where there is a single first node converges on a second node.

10. The non-transitory computer readable medium according to claim 7, wherein the probability related to action by a second node on input data from a first node indicates a probability that an input from the first node will be used by the second node in a case where there are multiple first nodes converging on a single second node.

11. The non-transitory computer readable medium according to claim 6, wherein the dataset includes data from one of the following domains imaging, text, time series, speech.

12. The non-transitory computer readable medium according to claim 7, wherein the reproducing child candidate data augmentation policy models includes at least one of recombining and mutating the selected one or more evaluated initial candidate data augmentation policy models.

* * * * *